C. G. BRANCH.
GRAIN SEPARATOR.
APPLICATION FILED NOV. 26, 1910.

1,007,522.

Patented Oct. 31, 1911.

2 SHEETS—SHEET 1.

WITNESSES:

INVENTOR
CHARLES GUY BRANCH.

BY
ATTORNEYS

C. G. BRANCH.
GRAIN SEPARATOR.
APPLICATION FILED NOV. 26, 1910.
1,007,522.
Patented Oct. 31, 1911.
2 SHEETS—SHEET 2.
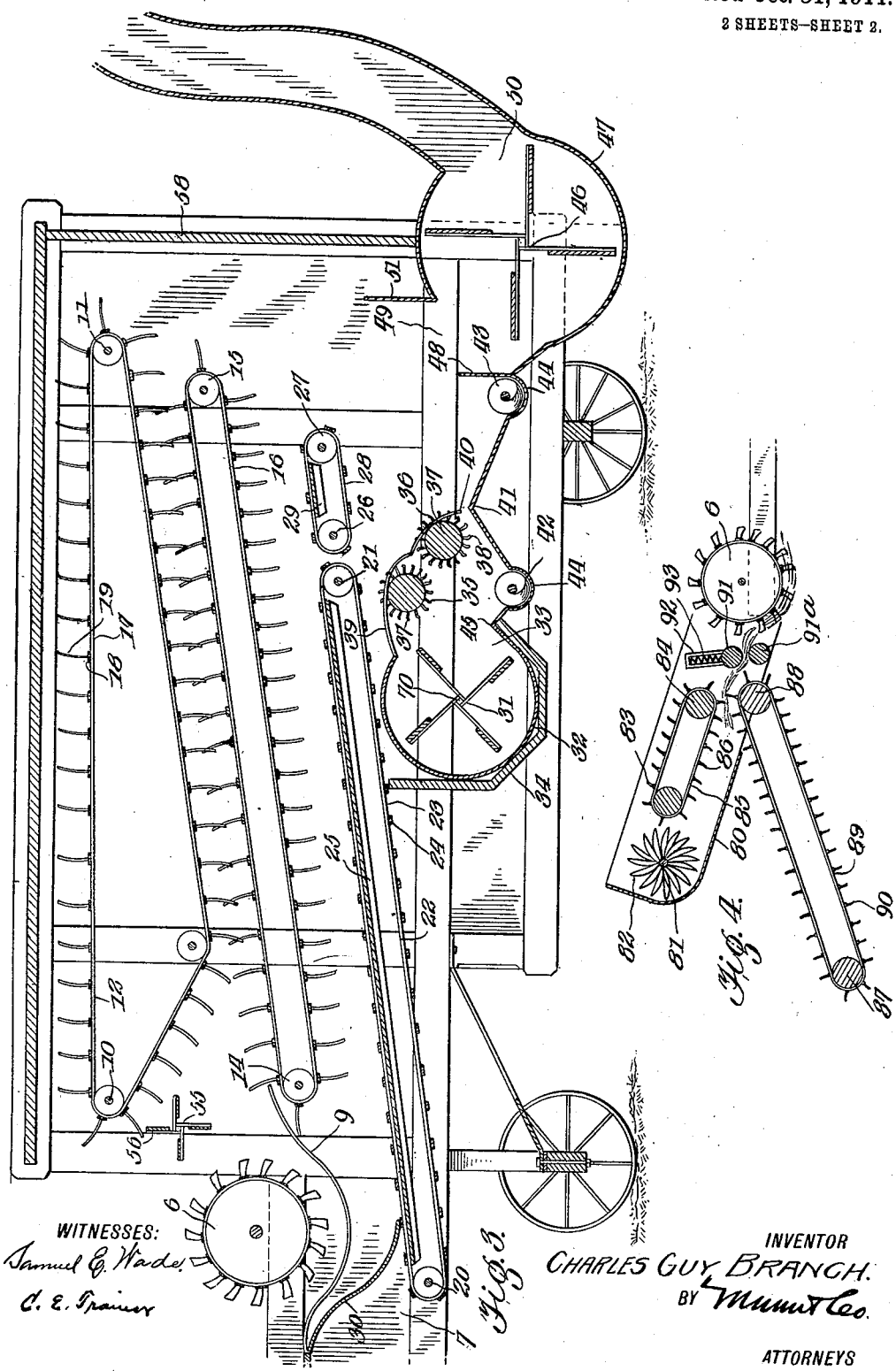
WITNESSES:
INVENTOR
CHARLES GUY BRANCH.
BY
ATTORNEYS

UNITED STATES PATENT OFFICE.

CHARLES GUY BRANCH, OF WICHITA, KANSAS.

GRAIN-SEPARATOR.

1,007,522.　　　　　Specification of Letters Patent.　　Patented Oct. 31, 1911.

Application filed November 26, 1910. Serial No. 594,406.

*To all whom it may concern:*

Be it known that I, CHARLES GUY BRANCH, a citizen of the United States, and a resident of Wichita, in the county of Sedgwick and State of Kansas, have invented certain new and useful Improvements in Grain-Separators, of which the following is a specification.

My invention is an improvement in grain separators, and consists in certain novel constructions and combinations of parts hereinafter described and claimed.

The object of the invention is to provide a device of the character specified, wherein all vibrating parts are eliminated, the grain being separated by carriers and the like, thus dispensing with noise, and eliminating the great strain on the mechanism of vibrating or reciprocating parts.

Figure 1:
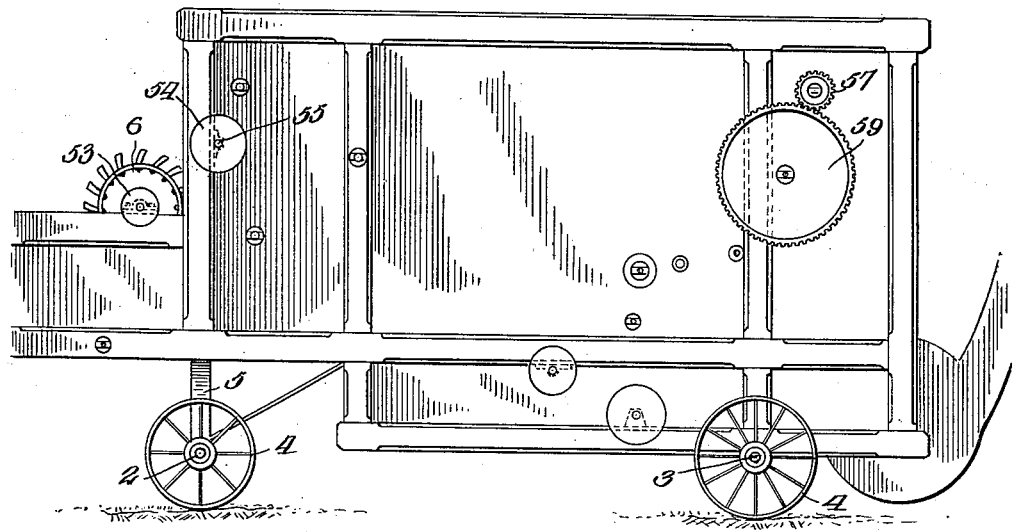
Figure 2:
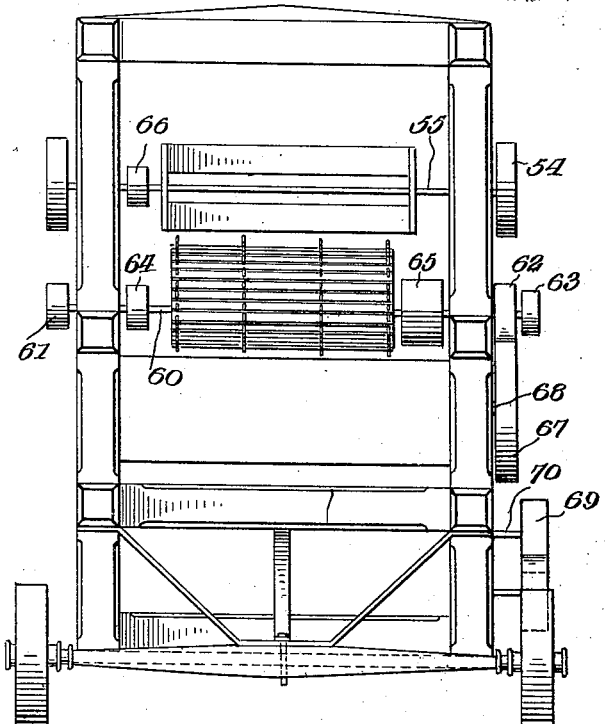

Referring to the drawings forming a part hereof, Figure 1 is a side view of the improvement. Fig. 2 is a front view. Fig. 3 is a vertical longitudinal section, and, Fig. 4 is a vertical longitudinal section of a feeding mechanism.

The present embodiment of the invention comprises a frame 1 of suitable form, supported by front and rear axles 2 and 3, each axle having wheels 4 journaled on the ends thereof. The front axle is rotatably connected with a bracket 5, at the front of the frame, and the rear axle is directly connected with the frame.

A cylinder is journaled at the front of the main frame on an extension 7 from the said frame, and a trough formed from spaced downwardly arched bars 9 is supported below the cylinder. Rollers 10 and 11 are journaled near the top of the frame, and at each end thereof, and an endless apron 12 is supported on the rollers. A third roller 13 is journaled transversely of the frame near the roller 10 and below the plane of the rollers 10 and 11, and the lower run of the apron 12 passes beneath the said roller. A roller 14 is journaled transversely of the frame at the rear of the bars 9, and a similar roller 15 is journaled near the rear of the frame below and in front of the roller 11. An endless apron 16 is supported by the said rollers 14 and 15.

The aprons 12 and 16 each consist of endless belts 17, running on the rollers, and connected at spaced intervals by transverse slats 18. Each slat 18 is provided with a plurality, four in the present instance, of fingers 19, each finger extending upwardly from the slat, and being arched rearwardly as shown. The fingers on the lower run of the apron 12, and those on the upper run of the apron 16 intersect as shown in Fig. 3.

A roller 20 is journaled in the extension 7 below the bars 9, and a second roller 21 is journaled somewhat to the rear of the center of the main frame. An endless apron or carrier 22 is supported on the rollers, the said carrier consisting of belts 23, connected at spaced intervals by transverse slats 24. A grain board 25 is arranged below the upper run of the said carrier, and the said board extends from the roller 20 to the roller 21. A pair of rollers 26 and 27 are arranged in spaced relation behind the roller 21 and in line with the rollers 20 and 21, and an endless carrier 28 similar to the carrier 22 is supported on the rollers. A grain board 29 is arranged below the upper run of the carrier, and the roller 26 is spaced apart slightly from the roller 21.

A deflecting plate 30 is arranged in the extensions below the bars 9, for guiding the chaff and grain, falling through the bars onto the carrier 22. A fan 31 is arranged below the carrier 22 near the rear end thereof, and the fan is inclosed by a fan casing 32 of cylindrical shape and opening at the rear at 33. The casing is inclosed by a sheathing 34 of wood or like material.

A pair of spaced rollers 35 and 36 are arranged directly below the space between the adjacent ends of the carriers 22 and 28, and each roller is provided on its peripheral surface with a plurality of teeth 37. Each of the teeth is radial to the roller, and is hooked at its free end as shown at 38. The rear roller 36 is below the level of the roller 35, and each roller coöperates with a species of screen 39 and 40. Each of the said screens consists of a plurality of bars arranged alongside each other in spaced relation, and the teeth 37 of the rollers extend between the bars. The teeth are arranged in rows, and the rear end of the screen 37 is connected with the forward end of the screen 40. The forward end of the screen 39 is connected with the upper edge of the opening 33 of the fan casing, and the rear end of the screen 40 is directly above a rib 41 arranged transversely of the frame. The rib 41 deflects the grain forwardly and rearwardly, and a screw conveyer 42—43 is arranged on each side of the rib, transversely of the frame. Each conveyer is arranged in a trough 44 substantially semicircular in cross section, and the conveyer 42 is separated from the fan casing 32, by a transverse rib 45 on the bottom of the frame.

A fan 46 is arranged behind the conveyer 43, in a substantially cylindrical casing 47, and a vertical baffle plate 48 is arranged transversely of the frame between the conveyer 43, and the fan casing. The casing is provided with a transverse opening 49 at its front, and with a similar opening 50 at its rear, both openings being above a horizontal plane passed through the center of the casing. A vertical baffle plate 51 is arranged at the upper edge of the opening 48, and a straw carrier 52 leads from the opening 50 of the fan casing. The cylinder 6 is driven by the usual motor (not shown), and is provided with a pulley 53, by means of which it may be connected with a pulley 54 on a shaft 55 journaled at the front of the frame below the roller 10.

A fan 56 is secured to the shaft 55, the said fan being between the rollers 10 and 14, and somewhat in front of them. The roller 11 is provided with a pinion 57 outside of the casing 58 inclosing the mechanism, and the said pinion meshes with a gear wheel 59 on the roller 15. The shaft 60 of the roller 14 is provided (outside of the frame) with pulleys 61—62 and 63, and inside of the frame with pulleys 64 and 65. The shaft 55 of the fan is provided with a pulley 66 inside the frame, and adapted to be connected by a belt with the pulley 64 to drive the conveyer or apron 16, and the said apron drives the apron 12 through the pinion and gear wheel. A pulley 61 is secured to the shaft 60 of the roller 20, and may be connected with the pulley 62 by a belt (not shown) to drive the conveyer 22. The pulley 63 may be connected by a belt to a pulley 69 on the shaft 70 of the fan 31.

A special form of feeding device is shown in Fig. 4, the said device being mounted upon the extension 7 of the main frame, in front of the cylinder 6. The said device comprises a trough 80, open at its rear end, the said rear end delivering directly to the cylinder. A shaft 81 is journaled transversely of the trough near its forward end, and a plurality of band cutting knives or blades 82 are secured to the shaft, and extend substantially radial therefrom. The blades are curved longitudinally, as shown in Fig. 4. A pair of spaced rollers 83—84 are journaled transversely of the trough, between the shaft 81 and the cylinder, and an endless apron 85 is supported on the rollers. The said apron is provided with a plurality of transversely arranged rows of fingers 86. A roller 87 is journaled transversely of the extension below and in front of the forward end of the trough 80, and a second roller 88 is journaled transversely of the trough below the roller 84. An endless apron 89 is supported on the rollers 87—88, and the said apron is provided with a plurality of transverse rows of teeth 90. The trough 80 is inclined downwardly toward the cylinder 6, as is also the apron or carrier 85, and the apron or carrier 89 is inclined upwardly toward the cylinder, so that the rear or delivering ends of the carriers are close together. The opening or space between the delivery ends is directly in front of the cylinder. A pair of coöperating superposed corrugated rollers 91—91ª, are journaled transversely of the trough between the delivery ends of the apron, and the cylinder. The upper roller 91 is journaled in bearing blocks which are slidable in slots 92 in the side walls of the trough 80, and springs 93 normally act to press the roller 91 toward the roller 91ª.

The bundles of grain are passed onto the band cutting knives, and the loosened bundles are dropped onto the carrier 89, which moves the grain rearwardly toward the cylinder. The lower run of the carrier 85 moves in the opposite direction to the upper run of the carrier 89, so that the straw is thoroughly loosened and separated before reaching the rollers 91—91ª. The said rollers feed the straw to the cylinder, which beats out the grain, and passes the straw onto the carrier 16. The fan 56 blows out a part of the chaff as the straw passes from the cylinder to the carrier 16, over the bars 8, and the grain drops onto the carrier 22, while the straw is carried rearwardly by the carrier 16. The lower run of the carrier 17 moves forwardly, and the fingers on the two carriers move between each other, thoroughly beating out all of the grain, which drops onto the carriers 22 and 28. The straw is delivered at the rear of the carrier 16 and falls into the opening 49 of the fan casing, and is blown out at the chute by the fan. The grain is delivered by the carrier 22 to the rollers 35—36, which coöperate with the screens 39 and 40 to beat out any remaining straw or chaff. The fan 31 blows the chaff and straw into the stack, and the grain is removed by the conveyers 42 and 43.

It will be noticed that all of the usual vibrating or reciprocating beaters and the like are eliminated, all of the parts rotating or revolving, that is, moving continuously in one direction.

It will be noticed from an inspection of Fig. 3, that the screen 39 is substantially horizontal, inclining upwardly slightly at its beginning and downward at its rear end, and that the screen 40 is a substantial continuation of the screen 39. By so arranging the said screens, the straw is checked in its passage rearwardly when it strikes the incline at the beginning of screen 39, so that the toothed wheel coöperating therewith may operate to more thoroughly separate the grain from the chaff and straw. After the straw has passed the first toothed wheel it moves downward over the rear end of screen 39 and screen 40, being assisted in its passage by the blast of air from the fan. The air strikes the material on the screen at the best possible angle to blow the straw and chaff into the stack, while the grain falls on the sloping bottom bars, and is deflected to one or the other of the conveyers. The arrangement constrains the straw and chaff to first move slow and then quickly after it has been well shaken and started out by the roller. The force of gravity is utilized to assist in separating the grain from the chaff. The toothed wheels are a very necessary element of the combination, since they thoroughly beat and shake up the straw, preventing any compacting thereof, so that the grain is free to drop out of the straw on to the deflecting board. The screens and the wheels work together in harmony to secure an efficient cleaning action, thoroughly separating the grain and the straw, so that but a very small portion of the grain is passed out through the stack.

I claim:

1. In a grain separator, a fan, a casing for the fan having a longitudinal opening at the rear thereof, and a plurality of screens arranged across the opening, said screens being arranged one behind the other and each comprising spaced substantially parallel bars, a roller for each screen journaled transversely of the bars beneath the same and adjacent thereto, each of said rollers having hooked teeth extending between the bars, and means for delivering the unthreshed grain on to the screens, the foremost screen being substantially horizontal and the rearmost screen being inclined downwardly toward its rear end.

2. In a grain separator, the combination with a fan, and a casing for the fan having a longitudinal opening, of a screen arranged across the opening, said screen inclining upwardly from its beginning toward approximately the center of the screen, and thence inclining downwardly across the longitudinal opening, and toothed rollers journaled below the screen, the teeth of the rollers extending through the screen for the purpose specified.

CHARLES GUY BRANCH.

Witnesses:
R. C. SPENCER,
WM. W. WESTFALL.

---

Copies of this patent may be obtained for five cents each, by addressing the "Commissioner of Patents, Washington, D. C."